(12) United States Patent
Anema

(10) Patent No.: US 8,167,727 B2
(45) Date of Patent: May 1, 2012

(54) HIGH SPEED GEAR COUPLER

(75) Inventor: Atte Anema, Ommen (NL)

(73) Assignee: Opra Technologies, Hengelo (NL)

( * ) Notice: Subject to any disclaimer, the term of this patent is extended or adjusted under 35 U.S.C. 154(b) by 314 days.

(21) Appl. No.: 12/588,085

(22) Filed: Oct. 2, 2009

(65) Prior Publication Data

US 2011/0081975 A1 Apr. 7, 2011

(51) Int. Cl.
*F16D 3/18* (2006.01)
(52) U.S. Cl. .......................................... 464/16; 464/156
(58) Field of Classification Search .................... 464/16, 464/156, 158, 159; 290/52; 415/122.1, 124.2; 475/159, 160
See application file for complete search history.

(56) References Cited

U.S. PATENT DOCUMENTS

| | | | |
|---|---|---|---|
| 2,380,113 A * | 7/1945 | Kuhns | 464/156 X |
| 2,726,523 A | 12/1955 | Zrodowski et al. | |
| 3,093,010 A | 6/1963 | Spreitzer et al. | |
| 3,521,462 A * | 7/1970 | Heidrich | 464/156 |
| 4,004,433 A | 1/1977 | Calistrat | |
| 4,047,395 A | 9/1977 | Bendall | |
| 2007/0225111 A1 | 9/2007 | Duong et al. | |

FOREIGN PATENT DOCUMENTS

| | | |
|---|---|---|
| CH | 230 554 A | 3/1944 |
| GB | 667 217 A | 2/1952 |
| JP | 60-18920 A | 2/1985 |
| WO | WO-2009/052825 A2 | 4/2009 |

OTHER PUBLICATIONS

Universal Joint and Driveshaft Design Manual, AE-7, Society of Automotive Engineers, Inc., Warrendale, PA, pp. 185-198, TJ1079. S62 1979.*
Joe Corcoran, Douglas Lyle, Patrick McCormack, Tim Ortel, "Advances in Gas Turbine Couplings", Proceedings of the Thirty-Sixth Turbomachinery Symposium, 2007, pp. 157-172.
API Standard 671, "Special-Purpose Couplings for Petroleum, Chemical, and Gas Industry Services," Third Edition, Oct. 1998, pp. 1-39.
H. Birkholz, P. Dietz, M. Garzke, "Twintors®—Diaphragm Couplings for Turbo Machines," International Design Conference—Design 2000, May 2000, pp. 605-610.
Michael Calistrat, "Extend Gear Coupling Life (Part 2)," Koppers Co., Inc., Baltimore, MD, 1979.
Sauter Bachmann AG, Zaunweg 10, CH-8754 Netstal, pp. 1-2.

(Continued)

*Primary Examiner* — Gregory Binda
(74) *Attorney, Agent, or Firm* — Finnegan, Henderson, Farabow, Garrett & Dunner LLP

(57) ABSTRACT

The coupling apparatus includes a gear shaft, including a sun gear at one shaft end for connecting to a reduction gear box. The sun gear drives a planetary gear train inside the gearbox. The coupling apparatus has outer splines on the gear shaft other end that mesh with inner splines of a ring gear connected to a coupling flange member by bolts and nuts. The flange member transmits high torque from a high speed turbine shaft to the gear shaft through the intermeshed splines. The teeth of the inner and outer splines are kept lubricated from a stationary spray source on the turbine side via an oil catcher mounted on the flange member opposed to the ring gear. The flow of lubricating oil during operation is from the oil catcher, through holes in the flange member, and to the intermeshed splines. Both oil catcher and ring gear are centered by a rim positioned on the flange member.

17 Claims, 7 Drawing Sheets

OTHER PUBLICATIONS

KOP-FLEX Engineered Couplings, pp. 1-4.
John Crane UK Ltd, "Metastreamcouplings," pp. 1-9.
EKK Global Sealing Solution Provider, pp. 1-2.
Smalley Steel Ring Co., Retaining Rings, Snap Rings and Wave Springs, pp. 1-2.
Smalley Steel Ring Co., "Wind Your Way Through Easy Installation," pp. 1-17.
Voith Turbo BHS Getriebe GmbH, Dec. 29, 2009, pp. 1-4.
International PCT Search Report mailed Dec. 20, 2010 for PCT Application No. PCT/IB2010/002588, filed Sep. 29, 2010.

* cited by examiner

VIEW AA

HIGH SPEED GEAR COUPLER

FIELD OF THE INVENTION

The present invention relates to apparatus for interconnecting a rotary prime mover and a speed reducer. More particularly, the present invention relates to apparatus for interconnecting a high speed driver, such as a gas turbine, and a geared speed reducer for transmission of power.

BACKGROUND OF THE INVENTION

Difficulties in interconnecting high speed drivers, such as gas turbines, with speed reducers include the possibilities of misalignment, lateral and/or angular, between the axis of the driver and the axis of the high speed input of the speed reducer. The misalignment can cause undue wear and possible failure of the interconnecting apparatus due to fatigue if the misalignment is taken up by a flexible member. Possible wear or other damage to the prime mover and/or the speed reducer can also occur.

Conventional apparatus for interconnecting high speed drivers and speed reducers include one or more relatively thin, flexible annular disks joined at their outer peripheries, with their respective inner peripheries connected to the driver and the speed reducer usually by one or more shafts. The "Twin Tor" coupler made by Voith is an example of such conventional coupling apparatus. Shortcomings of such conventional coupling apparatus include the possibility of catastrophic fatigue failure of the flexible disks, due to lower safety margins at high peak loads and susceptibility for excitation at critical (resonant) frequencies.

SUMMARY OF THE INVENTION

One aspect of the present invention includes apparatus for interconnecting a high speed driver with a speed reducer. The apparatus includes an elongated gear shaft defining a longitudinal axis and having opposed first and second ends and means for operatively connecting the first end of the gear shaft to the speed reducer. The apparatus also includes a gear coupling positioned at the second end of the gear shaft to the driver, the gear coupling being axi-symmetric and including radially inwardly facing and radially outwardly facing sets of splines. The spline sets are intermeshed and provide a gear ratio of 1:1. The gear coupling further including means for connecting to the driver.

Another aspect of the invention includes apparatus for generating power. The power generating apparatus includes a gas turbine engine having a drive shaft, a reduction gear box having a high speed input, and a coupling device interconnecting the drive shaft to the high speed input. The coupling device has an elongated gear shaft defining a longitudinal axis and having opposed first and second ends, a sun gear positioned at the first end of the gear shaft and operatively connected to the high speed input of the reduction gear box, and a gear coupling positioned at the second end of the gear shaft adjacent to the gas turbine drive shaft. The gear coupling included radially inwardly facing and radially outwardly facing sets of intermeshed splines and has a gear ratio of 1:1. The gear coupling further includes a flange assembly interconnected to the gas turbine drive shaft. The radially inwardly facing splines are associated with the flange assembly and the radially outwardly facing splines are associated with the gear shaft.

Additional aspects of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE DISCLOSED EMBODIMENTS

Figure 1:
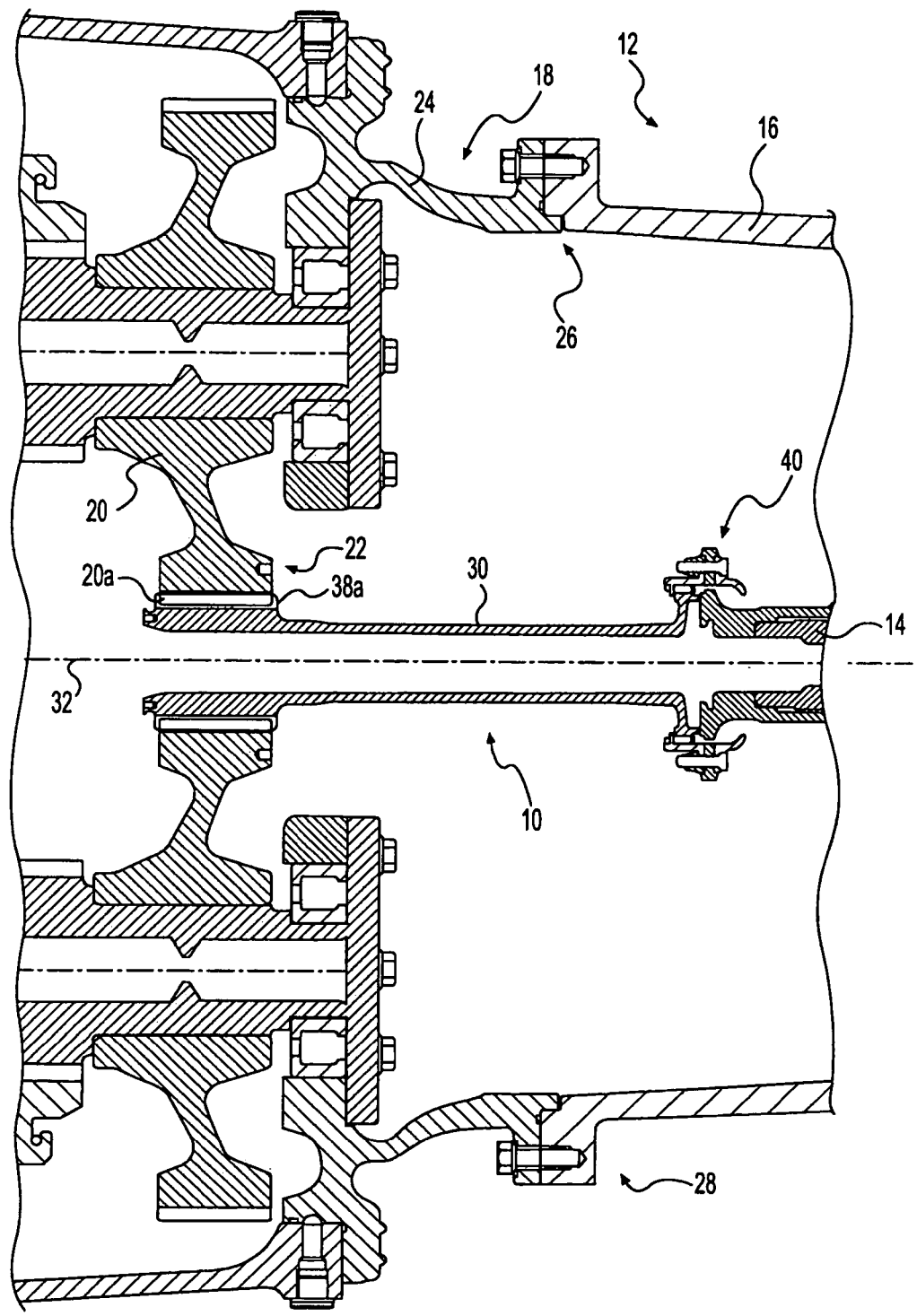
FIG. 1 is a cross-relational view of a portion of a gas turbine power generator using a coupling apparatus in accordance with the present invention to interconnect a gas turbine and a speed reducer.

FIG. 1 depicts rotary apparatus designated generally by the numeral 10 for interconnecting a high speed driver with a speed reducer. In the depicted apparatus, the high speed driver is a gas turbine engine 12 having an output or drive shaft 14 and a casing 16. The speed reducer 18 depicted in FIG. 1 includes planetary gear train 20, geared high speed input connection 22, and speed reducer casing 24. In the depicted apparatus, the generating speed of turbine drive shaft 14 may be between about 15000 RPM and 40000 RPM, and the power transmitted to gear coupling 10 may be between about 500 KW and 3000 KW. As shown, driver casing 16 and speed reducer casing 24 are connectable at joint 26 to comprise power generating set 28. Joint 26 being separable also provides access to coupling apparatus 10 for assembly, maintenance, etc.

Figure 2:
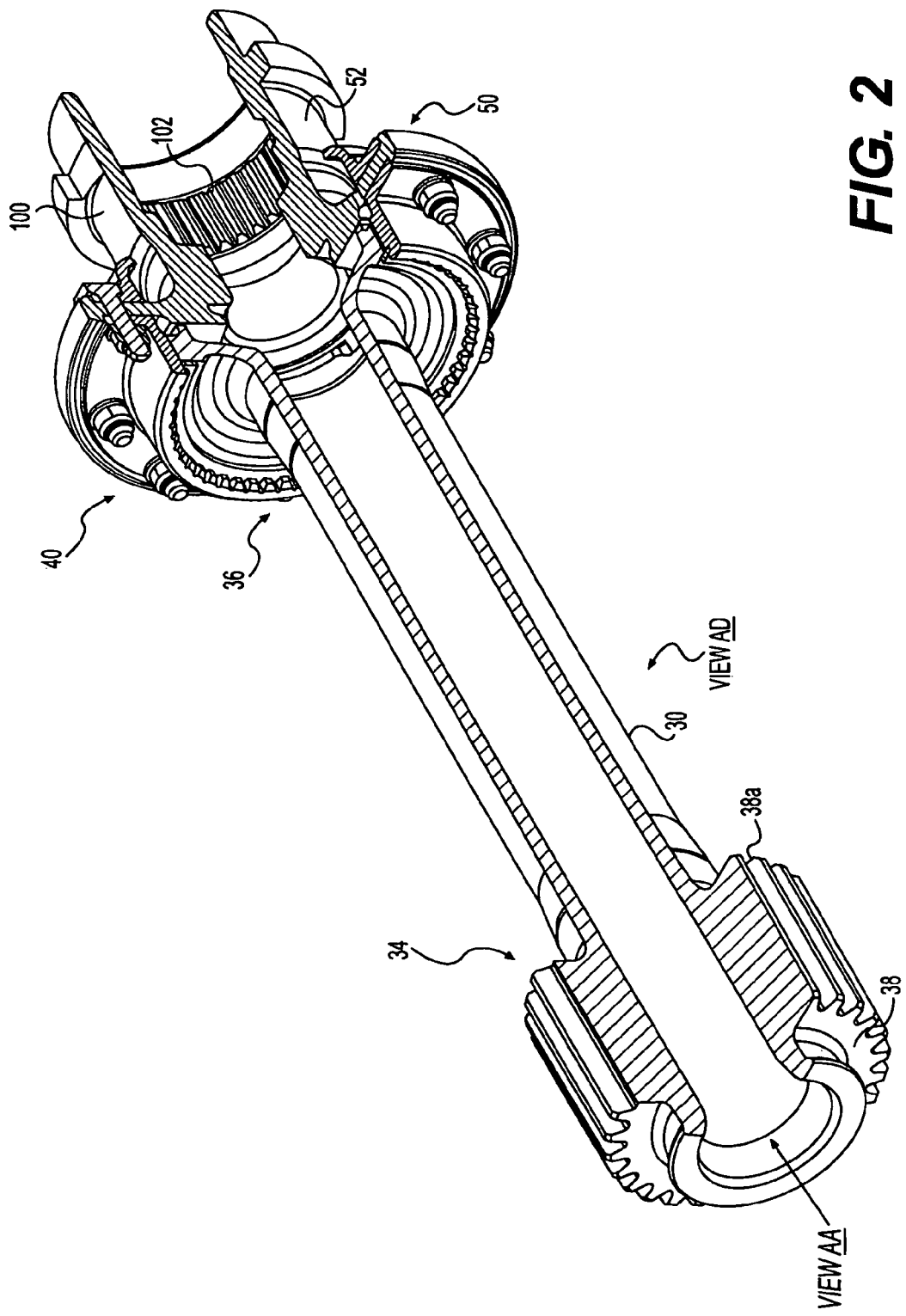
FIG. 2 is an isometric view of the coupling apparatus of FIG. 1.
Figure 3:
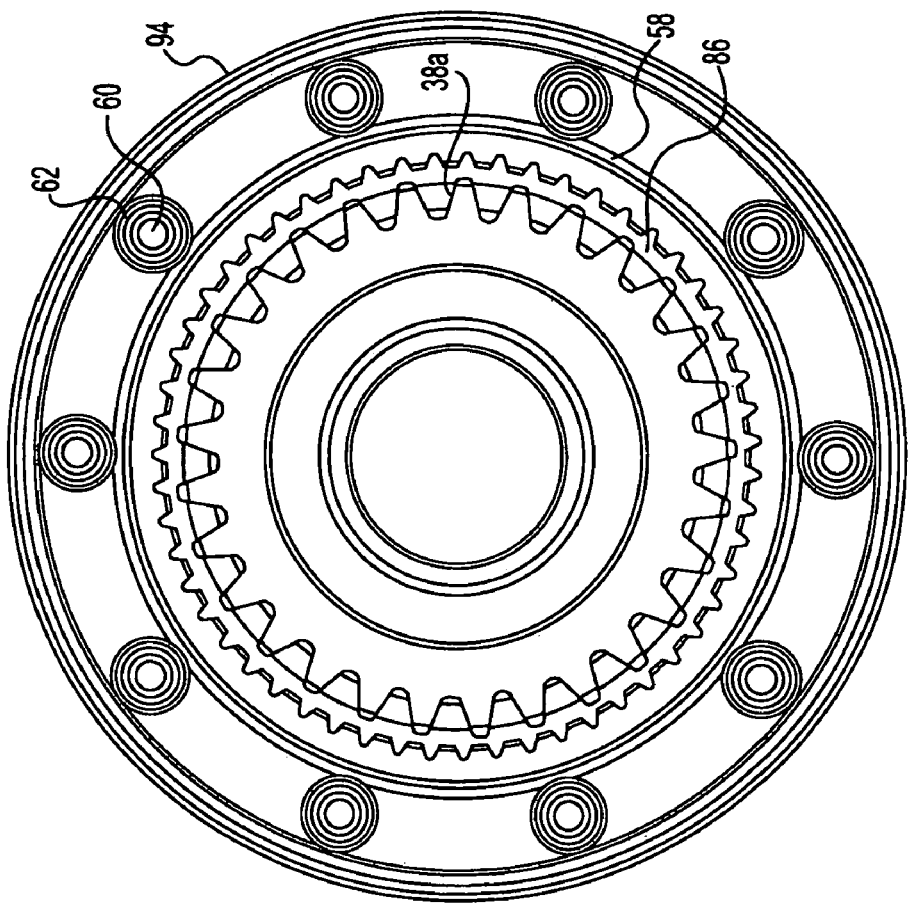
FIG. 3 is an end view along AA of the coupling apparatus shown in FIG. 2.

In accordance with the present invention, the coupling apparatus includes an elongated gear shaft defining a longitudinal axis and having opposed axial ends. As embodied herein, and with initial reference to FIGS. 1 and 2, coupling apparatus 10 includes elongated gear shaft 30 having a longitudinal axis 32 and opposed axial ends 34, 36. Gear shaft 30 may be hollow (as depicted) or solid. The length of gear shaft 30 may depend upon the particular application. Suitable materials for gear shaft 30 include high strength steels, like case-hardened or nitriding steels.

Further in accordance with the present invention, the coupling apparatus includes a means for operatively connecting the first end of the gear shaft to the speed reducer. As embodied herein, axial opposed end 34 is configured with sun gear 38 to mesh with planetary gear train 20 at high speed input 22. It may be preferred that sun gear teeth 38a, and also preferably the flanks of sun gear 38, are crowned to accommodate possible angular misalignment between gear shaft axis 32 and the axis high speed input connection 22. Gear teeth 20a in planetary gear train 20 also may be suitably crowned in this regard.

One skilled in the art would realize and appreciate that gear shaft end 34 could have "means" other than sun gear 38 for connecting to a speed reducer, depending upon the configuration of the high speed input. For example, and not by limitation, if the speed reducer to be used in power generating set 28 has a splined shaft as a high speed input, axial gear shaft end 34 may be configured as a mating collar with internal splines.

Further in accordance with the present invention, the coupling apparatus includes a gear coupling positioned at the other gear shaft axial end. The gear coupling is axi-symmetric and includes intermeshed sets of radially outwardly facing and radially inwardly facing splines providing a gear ratio of 1:1. The gear coupling also includes a means for connecting to the driver. As embodied herein and with reference to FIGS. 4A-4D, the gear coupling designated generally by the numeral 40 includes a set of outwardly facing splines 42 positioned on radially extending part 44 of gear shaft end 36. Gear coupling 40 also includes flange assembly 50 including flange member 52 having a radially extending portion 54 positioned axially adjacent radially extending portion 44 of gear shaft end 36. Flange member 52 further includes a collar portion 100 spaced from gear shaft end 36 and having internal splines 102 for connecting to splined drive shaft 14 of gas turbine 12 (see FIGS. 1 and 2). Other flange assembly-driver connection "means" are, of course, possible depending upon the configuration of the turbine draft shaft, as one skilled in the art would appreciate. For example, if turbine drive shaft 14 included a collar with inwardly facing splines, the gear coupling could include the flange assembly 50 equipped with a splined stub shaft.

Flange assembly 50 further includes ring gear member 58 on which is provided a set of radially inwardly facing splines 64. Ring gear 58 is attached to flange member 52 by a plurality of angularly spaced bolts 60 and nut fasteners 62. As best seen in FIGS. 4A-4D, splines sets 42 and 64 are intermeshed and are configured to transmit the required torque/power from gas turbine drive shaft 14 to gear shaft end 36. The intermeshed spline sets 42 and 64 provide a gear ratio of 1:1. Also, as is evident from FIGS. 4A-4C, gear coupling 40 including flange assembly 50 is axi-symmetric about axis 32, thereby facilitating high speed rotation.

It may be preferred that the set of radially outwardly facing splines 42 are surface hardened, such as by a hardening coating 42a (FIG. 4B), relative to that of the inwardly facing set of splines 64 in order to provide preferential wear on the splines 64. Splines 64, if worn, can be easily replaced by unbolting and replacing ring gear 58 during scheduled maintenance, including field maintenance. In comparison, replacing a worn set of splines 42 would require replacing gear shaft 30, a more costly component. A suitable hardening coating for splines 42 is DLC (diamond-like carbon coating), such as Balzers Balinit $C_1$. Moreover, the relatively "open" geometry of ring gear 58 allows precision machining of spline set 64, possibly to a "quality 5" DIN standard.

Specifically, the open geometry of ring gear 58 allows grinding of inner teeth of spline set 64, as compared to configurations where the teeth only could be made by means of cutting. Grinding gives much more accuracy on teeth dimensions and run-out. Wear and unbalance will be reduced and lifetime will increase.

In the depicted embodiment, the outwardly facing set of splines 42 is "associated" with the gear shaft 30 while the inwardly facing spline set 64 is "associated" with flange assembly 50 being attached to flange member 52. This "association" is intended to mean that power flows from the inwardly facing spline set 64 to the spline set 42 during operation. In other configurations (not shown) it may be preferred to reverse the respective "associations", such as where the ring gear with inwardly facing splines is directly attached to the gear shaft, while the outwardly facing splines are directly attached to another member of the flange assembly. Such constructions are also considered to be within the scope of the present invention, in its broadest context.

Further, it may be preferred to provide a lubricating system to lubricate the inwardly and outwardly facing spline sets during rotary operation. As embodied herein and as depicted in FIGS. 4A-4D, gear coupling 10 includes oil lubricating system 70. Oil lubricating system 70 includes an annular oil catcher 72 attached to flange member 52 by the same through bolts 60 and nut fasteners 62 used to attach ring gear 58. Oil catcher 72 is configured to capture lubricating oil supplied by stationary oil supply 74 positioned adjacent flange member 52. Oil catcher 72 has a radially inwardly curved lip 76 positioned to capture oil sprayed or dripped from nozzle 78 of stationary source 74 onto rotating flange member 52. Centrifugal force imparted by rotating flange member 52 propels the oil toward oil catcher 72, giving rise to an oil lubrication flow path from nozzle 78 to flange 52 and then to oil catcher 72 as depicted by arrows F in FIG. 4B. Flange member 52 may be provided with an annular relief such as 80 to contact and position the sprayed or dripped oil.

Further, oil distribution system 70 includes a plurality of axial through-holes 82 in flange member portion 54. Through-holes 82 act to feed oil from reservoir 83 of oil catcher 72 to an annular oil collector space 84 adjacent spline sets 42 and 64 and defined in part by ring gear 58, during rotary operation. That is, both oil reservoir 83 and oil collector 84 depend upon centrifugal force to hold the oil in place and cause the oil to flow towards the spline sets, as one skilled in the art would appreciate. The annulus of "held" oil in collector 84 during operation may be, for example, 2 to 3 millimeters thick.

Figure 4A:
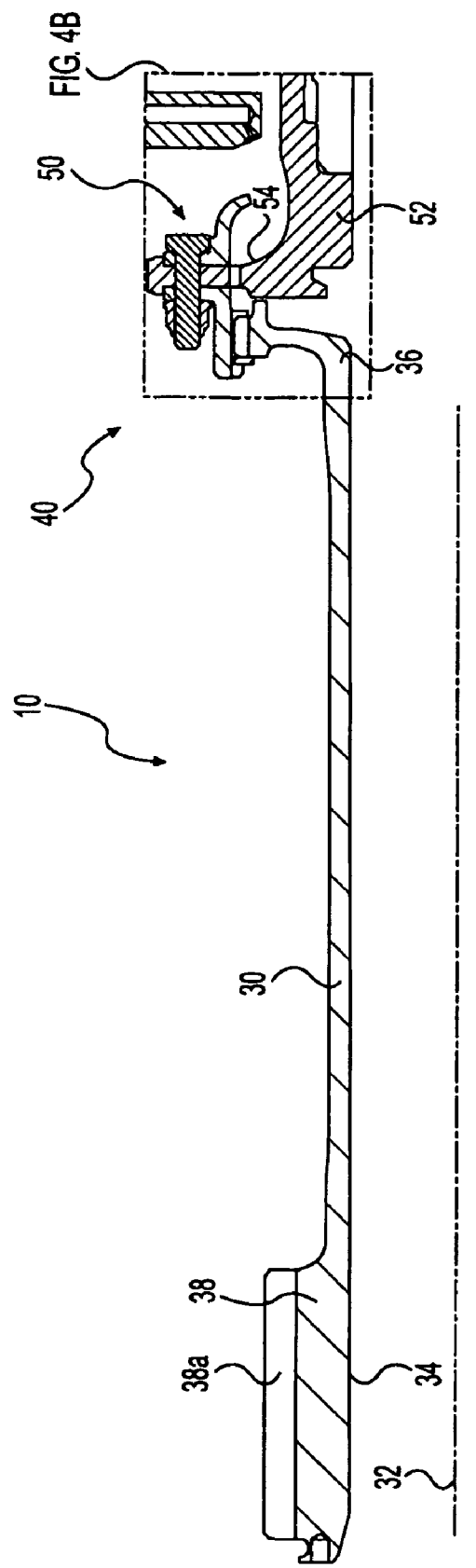
FIG. 4A is a partial cross-sectional longitudinal view along AD of the coupling apparatus shown in FIG. 2.
Figure 4B:
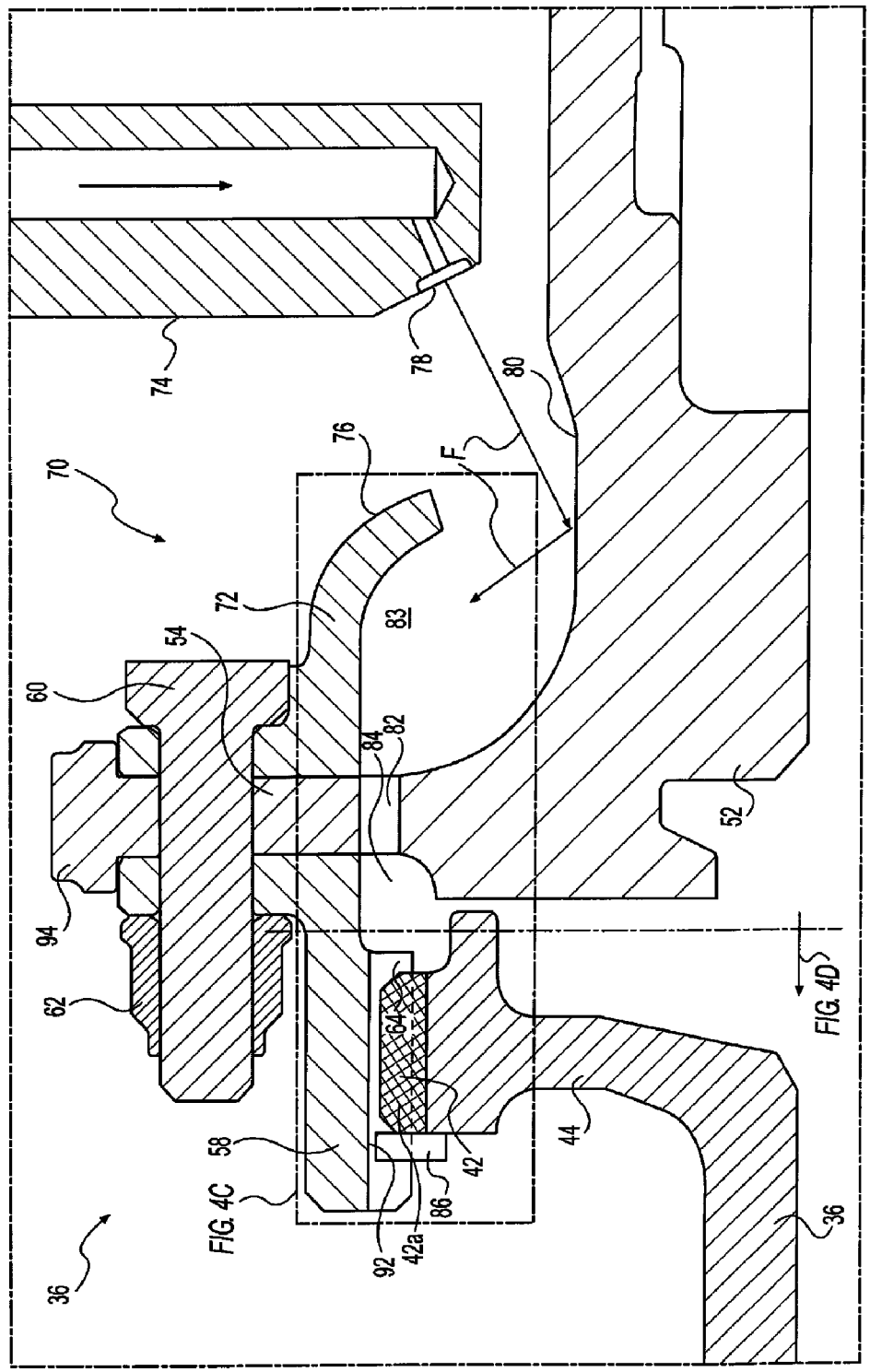
FIG. 4B is a cross-sectional view of a detail of FIG. 4A.
Figure 4C:
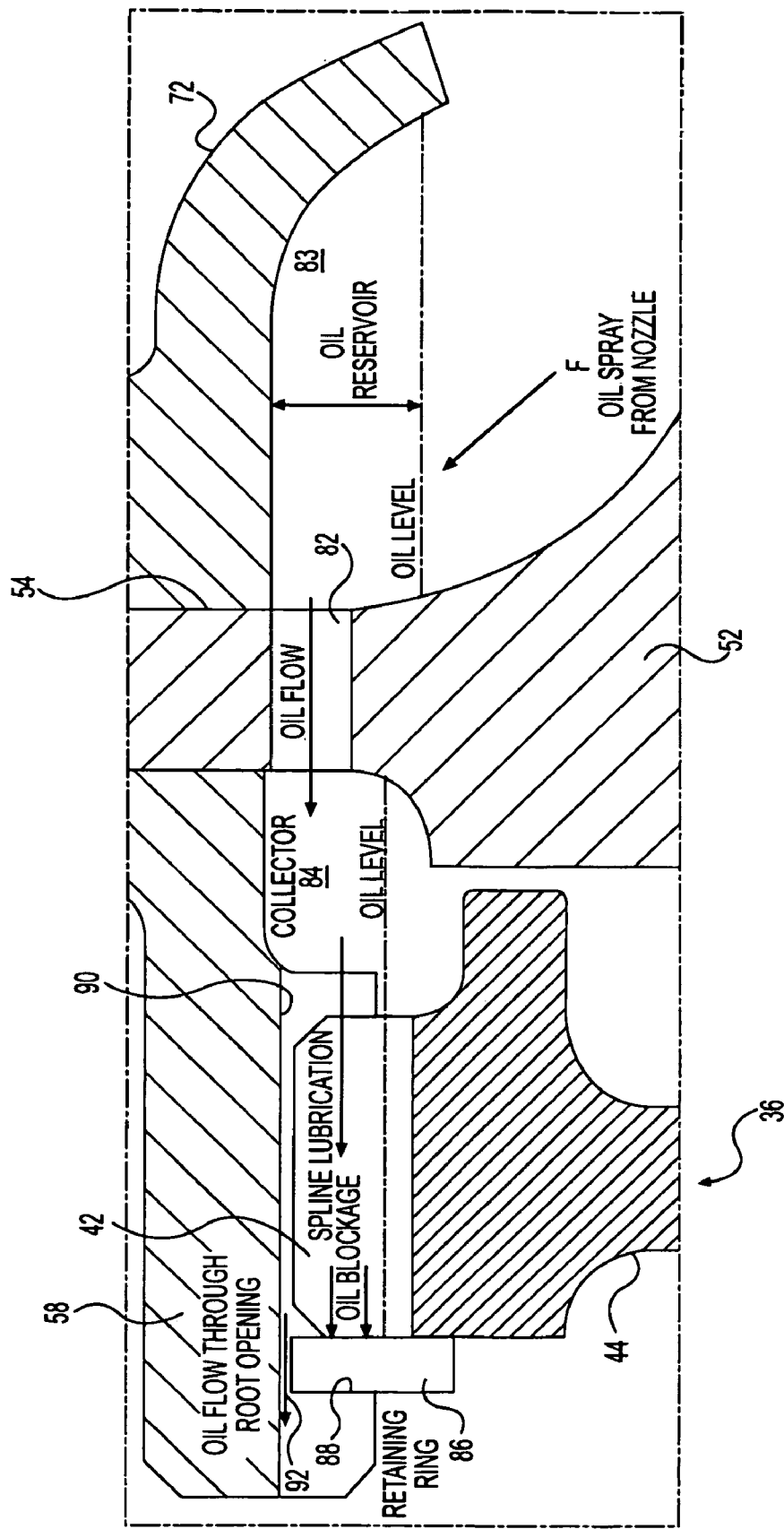
FIG. 4C is a cross-sectional view of a detail of FIG. 4B.
Figure 4D:
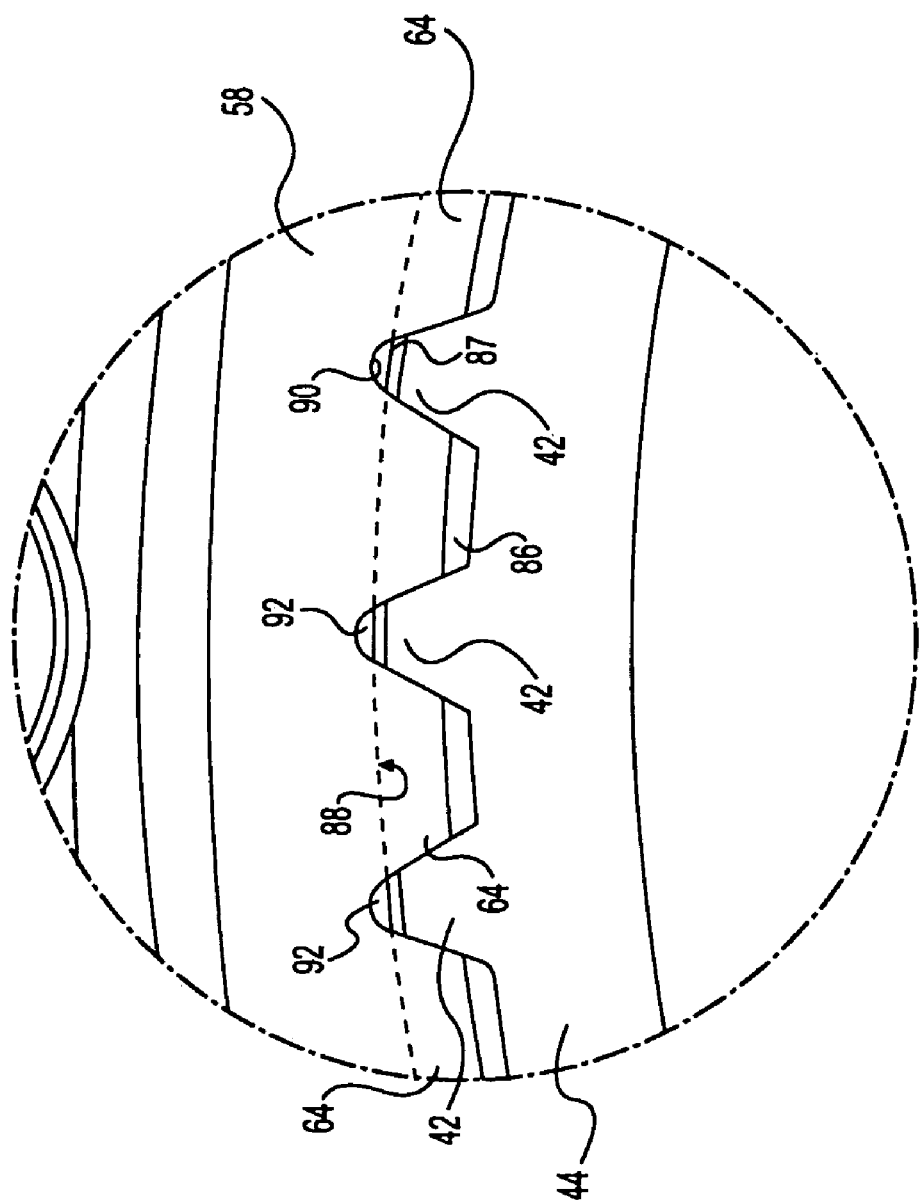
FIG. 4D is an end cross-sectional view along AC of a detail of FIG. 4B.

Still further, oil lubrication system 70 includes retainer ring 86 positioned on the downstream side of intermeshed spline sets 42 and 64, relative to the direction of lubricating oil flow past intermeshed spline sets 42 and 64. Retainer ring 86 may be a radially expendable, spiral-type ring having a radially outward spring force bias, such as is available from the Smalley Steel Ring Company, Lake Zurich, Ill. Retainer ring 86 is seated in, annular groove 88 formed in spline set 64 whereby the groove depth diameter determines the actual outer diameter 87 of retainer ring 86, since the ring 86 sits in groove 88 by spring-load. As best seen in FIG. 4D, the depth of groove 88, and thus the outer diameter 87 of retainer ring 86, may be set relative to the root diameter 90 of splines 64 to provide root openings 92 to regulate the flow of lubricating oil past intermeshed spline sets 42 and 64. The lubricating oil flowing through root openings 92 is thereafter discharged by centrifugal force into the cavity formed by the casings 16 and 24 (see FIG. 1), collected, and drained back to the oil supply (not shown). Retainer ring 86 also serves to prevent axial run-out of gear shaft 30.

While other configurations and locations of oil supply system 70 are possible, locating oil catcher 72 on the opposing side of flange member portion 54 from ring gear 58 allows the flange assembly 50 to be balanced to prevent distortion during high speed operation. That is, oil catcher 72 can be sized and configured to prevent "flowering" or tilting of flange member portion 54 toward axis 32 in order to maintain the parallelism of spline set 64 relative to spline set 42 during high speed operation. Additionally, ring 58 and oil catcher 72 can be centered by rim 94 of flange member portion 54 during operation. Still further, in the disclosed configuration of oil lubricating system 70, the position and number of through-holes 82 in flange member portion 54 are largely independent of the pattern of splines 64, thereby permitting greater design flexibility.

Other embodiments of the invention will be apparent to those skilled in the art from consideration of the specification and practice of the invention disclosed herein. It is intended that the specification examples be considered as exemplary only, with a true scope and spirit of the invention being indicated by the following claims.

What is claimed is:

1. Apparatus for interconnecting a high speed driver with a speed reducer, the apparatus comprising:
    an elongated gear shaft defining a longitudinal axis and having opposed first and second ends;
    means for operatively connecting the first end of the gear shaft to the speed reducer;
    a gear coupling positioned at the second end of the gear shaft adjacent to the driver, the gear coupling being axi-symmetric and including radially inwardly facing and radially outwardly facing sets of splines, the sets being intermeshed and providing a gear ratio of 1:1, the gear coupling further including a retainer ring for preventing axial run-out of the gear shaft, and means for connecting to the driver; and
    a system for lubricating the intermeshed inwardly and outwardly facing splines with oil during rotary motion, the system flowing oil axially past the intermeshed splines,
    wherein the retainer ring is positioned axially to abut the outwardly facing splines, and
    wherein the retainer ring is sized and configured to define with the roots of the inwardly facing splines, openings for regulating lubricating oil flow axially past the intermeshed inwardly and outwardly facing splines.

2. The apparatus as in claim 1, wherein the speed reducer has a planetary gear train with a high speed input, and wherein the means for connecting the first end includes a sun gear positioned on the first gear shaft end, the sun gear being configured to be intermeshed with the planetary gear train.

3. The apparatus as in claim 2, wherein both the sun gear and the intermeshed splines in the planetary gear train are crowned to accommodate possible angular misalignment.

4. The apparatus as in claim 1 wherein the radially outwardly facing splines have a coating for hardening the outwardly facing splines relative to the inwardly facing splines, and wherein the gear coupling includes a replaceable member on which the radially inwardly facing splines are positioned.

5. The apparatus as in claim 1, wherein the lubricating system includes a stationary source of lubricating oil, wherein the lubricating system further includes an oil catcher positioned on the gear coupling and configured to catch oil supplied from the stationary source, and wherein the openings are in flow communication with the oil catcher.

6. The apparatus as claim 5, wherein the lubricating system further includes an oil collector positioned adjacent the inwardly and outwardly facing splines for supplying oil to the spline sets; an oil reservoir associated with the oil catcher; and one or more through-holes in a gear coupling member, the through-holes interconnecting the reservoir and the collector, the openings being in flow communication with the oil catcher through the oil reservoir, the through-holes, and the oil collector.

7. The apparatus as in claim 1, wherein the radially outwardly facing splines are positioned on the gear shaft second end, and wherein the gear coupling includes a flange assembly having a replaceable member on which the radially inwardly facing splines are positioned.

8. The apparatus as in claim 1, wherein the outwardly facing splines are positioned on the gear shaft second end, and wherein the gear coupling includes a flange assembly having a ring gear having the inwardly facing set of splines, the flange assembly also including a flange member for connecting the ring gear to the driver, the ring gear being configured to be replaceable detachable from the flange member.

9. The apparatus as in claim 8, wherein the flange member includes a splined collar spaced from the gear shaft second end and configured to be connectable to the driver.

10. The apparatus as in claim 8, wherein the flange assembly further includes a oil catcher, wherein the flange member has a radially outer rim configured to radially constrain the ring gear and the oil catcher, and wherein the flange member, the ring gear, and the oil catcher are configured to provide self-centering during high speed operation.

11. The apparatus as in claim 8, wherein the flange assembly further includes an oil catcher for catching lubricating oil supplied from a stationary source during operation, wherein the ring gear and the oil catcher are secured to opposing axial sides of the flange member, and wherein the ring gear, the flange member and the oil catcher are configured to maintain parallelism of the inwardly facing splines relative to the outwardly facing splines during high speed operation.

12. The apparatus as in claim 8, wherein the ring gear is configured to have an oil collector for collecting lubricating oil during operation and for supplying the lubricating oil to the inwardly and outwardly facing splines, and wherein the oil collector and an oil catcher reservoir are in fluid communication via a plurality of through-holes in the flange member.

13. The apparatus as in claim 1, wherein the inwardly facing splines are positioned on a ring gear, and wherein the ring gear includes an annular groove formed in the inwardly facing splines and configured to seat an outer diameter of the retainer ring at a predetermined radial distance from a root diameter of the inwardly facing splines.

14. Apparatus for generating power comprising:
    a gas turbine engine having a drive shaft;
    a reduction gear box having a high speed input; and
    a coupling device interconnecting the drive shaft to the high speed input, wherein the coupling device includes:
    (a) an elongated gear shaft defining a longitudinal axis and having opposed first and second ends;
    (b) a sun gear positioned at the first end of the gear shaft and operatively connected to the high speed input of the reduction gear box; and
    (c) a gear coupling positioned at the second end of the gear shaft adjacent to the gas turbine drive shaft, the gear coupling including radially inwardly facing and radially outwardly facing sets of intermeshed splines and having a gear ratio of 1;1, the gear coupling further including a flange assembly having a flange member interconnected to the gas turbine drive shaft, wherein the radially outwardly facing splines are positioned on the gear shaft, wherein the gear coupling includes a ring gear on which the inwardly facing splines are positioned, and wherein the gear coupling further includes a retainer ring configured and positioned to prevent axial run-out of the gear shaft; and
    a system for lubricating the intermeshed inwardly and outwardly facing splines with oil during rotary motion,
    wherein the retainer ring is positioned axially abutting the outwardly facing splines, and wherein the retainer ring and roots of the inwardly facing splines define openings for regulating lubricating oil flow past the intermeshed inwardly and outwardly facing splines.

15. The apparatus as claim 14, wherein the operating speed of the drive shaft is between about 15000 RPM and about 40000 RPM.

16. The apparatus as in claim 14, wherein the power transmitted through the drive shaft is between about 500 KW and about 3000 KW.

17. The apparatus as in claim 14, wherein the ring gear includes an annular groove formed in the inwardly facing splines and configured to seat an outer diameter of the retainer ring at a predetermined radial distance from a root diameter of the inwardly facing splines.

\* \* \* \* \*